(12) United States Patent
Kitamura et al.

(10) Patent No.: US 10,369,634 B2
(45) Date of Patent: Aug. 6, 2019

(54) CLAMP DEVICE

(71) Applicant: KITAMURA MACHINERY CO., LTD., Takaoka-shi, Toyama (JP)

(72) Inventors: Akihiro Kitamura, Takaoka (JP); Shigeru Yamada, Takaoka (JP)

(73) Assignee: KITAMURA MACHINERY CO., LTD., Takaoka-Shi, Toyama (JP)

( * ) Notice: Subject to any disclaimer, the term of this patent is extended or adjusted under 35 U.S.C. 154(b) by 0 days.

(21) Appl. No.: 15/740,838

(22) PCT Filed: Feb. 16, 2017

(86) PCT No.: PCT/JP2017/005711
§ 371 (c)(1),
(2) Date: Dec. 29, 2017

(87) PCT Pub. No.: WO2017/142018
PCT Pub. Date: Aug. 24, 2017

(65) Prior Publication Data
US 2018/0354042 A1 Dec. 13, 2018

(30) Foreign Application Priority Data
Feb. 18, 2016 (JP) .................................. 2016-028795

(51) Int. Cl.
*B23B 31/26* (2006.01)
*B23B 31/117* (2006.01)
*B23Q 3/12* (2006.01)
(52) U.S. Cl.
CPC .......... *B23B 31/263* (2013.01); *B23B 31/117* (2013.01); *B23Q 3/12* (2013.01)

(58) Field of Classification Search
CPC ... B23B 31/263; B23B 31/117; B23B 31/261; B23Q 3/12
See application file for complete search history.

(56) References Cited

U.S. PATENT DOCUMENTS

2011/0074121 A1 3/2011 Hangleiter

FOREIGN PATENT DOCUMENTS

JP 57-61438 4/1982
JP 63-57132 3/1988
(Continued)

OTHER PUBLICATIONS

International Preliminary Report dated Aug. 21, 2018, issued in corresponding PCT application No. PCT/JP2017/005711.
(Continued)

*Primary Examiner* — Alan Snyder
(74) *Attorney, Agent, or Firm* — Bacon & Thomas, PLLC

(57) ABSTRACT

To provide a clamp device which is designed to shorten a spindle than before, thus enabling the downsizing of a spindle device.
In a clamp device for removably mounting a tool holder to a spindle of a rotary spindle device, a clamp mechanism is placed in a clamp state by a reciprocation drive mechanism producing a rearward movement in which a draw-in sleeve (9) engaged therewith via steel balls (13) is moved rearward to bring through-holes (12) thereof to rearward large diameter portion (4*d*) in a bore region of a spindle body (4) and further rearward to a position where the steel balls (13) are retained between the rearward large diameter portion (4*d*) and a jig large diameter portion (14*a*), while the retreated draw-in sleeve (9) moves rearward a draw-in bolt (8) and a clamp sleeve (5) by means of a biasing force of an elastic member (10).

4 Claims, 2 Drawing Sheets

(56) References Cited

FOREIGN PATENT DOCUMENTS

| | | | | |
|---|---|---|---|---|
| JP | 01153203 A | * | 6/1989 | ........... B23B 31/263 |
| JP | 6158969 | | 6/2017 | |
| WO | 2013/132358 A1 | | 9/2013 | |

OTHER PUBLICATIONS

Japanese Search Report dated Apr. 25, 2017, issued in corresponding PCT application No. PCT/JP2017/005711.

* cited by examiner

CLAMP DEVICE

TECHNICAL FIELD

The present invention relates to a clamp device for mounting a tool holder to a spindle of a spindle device of a machine tool, for example.

BACKGROUND ART

A machine tool is provided with a clamp device for removably mounting the tool holder holding a tool, in a hollow spindle of the spindle device. During a working operation, the tool holder and the tool are rotated at high speed in conjunction with the rotation of the spindle.

Such a clamp device typically has a configuration where a clamp sleeve is attached to a distal end of a draw-in bolt which is axially reciprocated, while a distal end of the clamp sleeve is opened or closed according to the positional shift of the clamp sleeve with reciprocation of the draw-in bolt relative to a spindle body as an outer sleeve defining an outer periphery of the clamp sleeve. In an open state of the clamp sleeve, a tip of a pull-stud bolt of the tool holder is inserted in the clamp sleeve, then, in a closed state of the clamp sleeve, the pull-stud bolt is clamped in place.

As shown in FIG. 2, for example, a specific configuration of the clamp device is such that a clamp sleeve 105 slidably disposed in an interior space 103 of a hollow spindle body 104 constituting a spindle 102 is formed with a plurality of through-holes 106 on a circumference of a front end thereof at equal angular spaces, and steel balls 107 are fitted in the respective through-holes 106. The spindle body 104 includes in its bore region corresponding to the clamp sleeve 105: the bore region of the spindle body is formed with: a forward small diameter portion 104a conformable to an outside diameter of the clamp sleeve 105; and a large diameter portion 104b diametrally expanded from the forward small diameter portion.

In this clamp device 101, the clamp sleeve 105 is normally biased rearward by an elastic force of a coned disc spring 110. A drive mechanism for pushing forward a draw-in bolt 108 against the biasing force of the coned disc spring 110 is disposed at a rear end of the draw-in bolt 108.

In the case of the clamp device shown in FIG. 2, a piston rod 21 of a hydraulic cylinder 20 is coupled to the rear end of the draw-in bolt 108. When mounting a tool holder 30, therefore, the hydraulic cylinder 20 drives so as to advance the draw-in bolt forward, so that the coned disc spring 110 is flexed to push forward the clamp sleeve 105. This movement brings a region of the through-holes 106 to the forward large diameter portion 104b in the spindle body 104, establishing an unclamp state that allow the steel balls 107 in the through-holes to move outward. In this unclamp state, when a head 32 of a pull-stud bolt 31 connected to a tip of the tool holder 30 is inserted in the clamp sleeve 105 from a distal end thereof, the head 32 can pass through the inside of the clamp sleeve as pushing outward the steel balls 107.

When the hydraulic cylinder 20 stops pushing forward the draw-in bolt 108 after the insertion of the pull-stud bolt 31, the coned disc spring 110 restores the biasing force which pushes the draw-in bolt 108 rearward. Accordingly, the clamp sleeve 105 is also pulled rearward. This movement brings the region of the through-holes 106 to the forward small diameter portion 104a in the spindle body 104, while the steel balls 107 in the through-holes are pushed inward to be engaged with a neck under the head of the pull-stud bolt 31 and to clamp the pull-stud bolt. Thus is established a clamp state.

In addition to the above steel-ball type clamp portion, the clamp device also adopts a collet chuck type, for example. As disclosed in Patent Literature 1 and Patent Literature 2, this type of clamp device establishes the unclamp state and the clamp state by opening or closing a distal end of a collet, having an outside configuration in which a cylindrical body diametrally expanding in a tapered fashion and is formed with slits radially extended from the center thereof.

Specifically, the collet chuck type has a mechanism where the collet is displaced to the large diameter portion of the outer sleeve on the outside by being pushed forward by the draw-in bolt at the rear end against the biasing force of the coned disc spring, so that the distal end of the collet is opened to be placed in the unclamp state. And when the collet is pulled rearward by the biasing force of the coned disc spring in conjunction with the rearward movement of the draw-in bolt, the collet is displaced to the small diameter portion of the outer sleeve, so that the distal end of the collet is closed as externally clamped by an inside surface of the outer sleeve, thus the collet holding the head of the pull-stud bolt.

CITATION LIST

Patent Literature

Patent Literature 1: JP 2006-110652 A
Patent Literature 2: JP 2008-155343 A

SUMMARY OF INVENTION

Technical Problem

In the conventional clamp device as described above, the clamp sleeve is drawn to a clamp position and retained at the clamp position by the elastic biasing force of the coned disc spring applied via the draw-in bolt. That is, the clamp device is configured such that the force applied from the tool holder is directly received by the spindle body only through the coned disc spring in a substantial way. In this configuration, a required distance S for the draw-in bolt and clamp sleeve to move between an unclamp position and the clamp position must be covered by an expansion/contraction amount of the coned disc spring.

However, as many coned disc spring pieces as to provide the expansion/contraction amount for covering the movement distance S are axially arranged in layers in the spindle because the expansion/contraction amount of one piece of coned disc spring is limited. Since the clamp device requires a space large enough to accommodate such a large number of coned disc spring pieces, the spindle itself as well as the draw-in bolt are increased in length, making it difficult to downsize the spindle device.

In view of the above, the invention has an object to provide a clamp device which can shorten the spindle by achieving a notable reduction in the number of coned disc spring pieces disposed in the spindle, thus enabling the downsizing of the spindle device.

Solution to Problem

According to the invention, a clamp device for removably mounting a tool holder with a tool to a spindle of a rotary spindle device includes: a hollow spindle body constituting the spindle; a cylindrical clamp sleeve axially slidably disposed in an interior space of the spindle body; and a forward small diameter portion conformable to an outside diameter of the clamp sleeve and a forward large diameter portion diametrally expanded from the above diameter portion, the forward small diameter portion and forward large diameter portion defined in a forward bore region of the spindle body, and is equipped with a clamp mechanism which establishes a clamp state to clamp down a pull-stud bolt connected to a tip of the tool holder by moving a distal end of the clamp sleeve in the bore region of the spindle body from the forward large diameter portion to the forward small diameter portion, and which establishes an unclamp state to release the pull-stud bolt from clamping by moving the distal end of the clamp sleeve from the forward small diameter portion to the forward large diameter portion.

The clamp device according to the invention further includes: a draw-in bolt having an end connected to a rear end of the clamp sleeve opposite from the tool holder; a cylindrical draw-in sleeve axially slidably disposed in the interior space of the spindle body on the opposite side from the clamp sleeve; and a clamp jig slidably inserted in the draw-in sleeve from a rear end thereof and axially reciprocated in the spindle body as connected to a reciprocation drive mechanism on a side opposite from the tool holder of the spindle, and has a configuration wherein the draw-in bolt has the other end engaged with a front end of the draw-in sleeve via an elastic member such as a coned disc spring, the draw-in sleeve includes: a plurality of through-holes formed on a circumference of a rear end thereof at equal angular spaces; and steel balls fitted in the respective through-holes as allowed to move outward from and inward of the through-holes and having a diameter greater than the thickness of the draw-in sleeve, and the spindle body includes on a rear side of the bore region thereof opposite from the tool holder: a rearward small diameter portion conformable to an outside diameter of the draw-in sleeve; a diametrally expanding portion progressively increasing in diameter from the rearward small diameter portion toward the rear side in a tapered fashion; and a rearward large diameter portion constant in diameter and continuous to the diametrally expanding portion.

And further, the clamp device according to the invention has a configuration wherein the clamp jig includes: a jig large diameter portion conformable to an inside diameter of the draw-in sleeve; a jig diametrally reducing portion progressively decreasing in diameter from a rear end of the jig large diameter portion in a tapered fashion; and a jig small diameter portion constant in diameter and continuous to the jig diametrally reducing portion, and the clamp jig places the clamp mechanism in the unclamp state by way of forward movement produced by the reciprocation drive mechanism, and places the clamp mechanism in the clamp state by way of rearward movement produced by the reciprocation drive mechanism. As the clamp jig moves forward, the draw-in bolt, the other end of which is engaged with the clamp jig in the draw-in sleeve, is pushed forward against a biasing force of the elastic member, thus moving forward the clamp sleeve, and as the clamp jig moves rearward, the draw-in sleeve engaged with the clamp jig via the steel balls is moved rearward to bring the through-holes thereof to the rearward large diameter portion in the bore region of the spindle body and further rearward to a position where the steel balls are retained between the rearward large diameter portion and the jig large diameter portion, while the retreated draw-in sleeve moves rearward the draw-in bolt and the clamp sleeve by way of the biasing force of the elastic member.

According to the above-described configuration, in conjunction with the rearward movement of the clamp jig during transition to the clamp state, the draw-in sleeve, which is engaged with the clamp jig via the steel balls located at the rearward small diameter portion in the bore region of the spindle body and projected from the inside of the through-holes of the draw-in sleeve to the jig small diameter portion of the clamp jig, is also moved rearward. When the through-holes are brought to the rearward large diameter portion in the bore region of the spindle body, the steel balls are allowed to move outward from the through-holes and toward the rearward large diameter portion. Further moved rearward, the clamp jig pushes out the steel balls along a tapered surface of the jig diametrally reducing portion. In due time, the jig large diameter portion of the clamp jig is brought to place on the inner side with respect to the through-holes. Thus, the steel balls are pushed out to the large diameter portion of the bore region of the spindle body on the outer side with respect to the through-holes, and are engaged with the spindle body at the tapered surface of the diametrally expanding portion thereof. Thus, the draw-in sleeve is fixed to the spindle body by means of the clamp jig and the steel balls. According to the clamp device of the invention, a tool-holder side in the axial direction of the spindle is defined to be the front while the opposite side (the side of the reciprocation drive mechanism) is defined to be the rear.

In conjunction with the rearward movement of the draw-in sleeve, the draw-in bolt having the other end engaged with the front end of the draw-in sleeve via the elastic member is also moved rearward. In the forward bore region of the spindle body, therefore, the clamp sleeve is pulled rearward, so that the distal end of the clamp sleeve is moved from the forward large diameter portion of the spindle body to the forward small diameter portion thereof so as to be externally clamped down by the spindle body. Thus is established the clamp state to clamp the pull-stud bolt of the tool holder.

As described above, the transition to the clamp state according to the invention is not started from biasing based on restorative force of a plurality of coned disc spring pieces as performed by the conventional device. Rather, the transition to the clamp state is started by the rearward movement of the draw-in sleeve triggered by a driving force from the drive mechanism. Further, a holding power on the tool holder in the clamp state is not directly received by the coned disc spring as before, but by the spindle body, to which the draw-in sleeve is fixed by means of the steel balls and the clamp jig.

The elastic member disposed in the clamp device according to the invention serves well the purpose if the elastic member can produce a force of drawing the tool holder into the clamp sleeve via the draw-in bolt. The drawing force is produced based on the restorative force to compressive force applied to the elastic member when the draw-in sleeve is moved rearward. Specifically, the elastic member has only a contraction allowance equivalent to quite a short stroke to produce an elastic energy required for shifting the draw-in bolt and clamp sleeve from the unclamp state to the clamp state. In a case where the elastic member is the coned disc spring, the clamp device needs far fewer coned disc spring pieces than the conventional device.

Hence, an area of the coned disc spring disposed in the interior space of the spindle body is notably reduced so that the spindle itself can be notably reduced in length. This also provides for the downsizing of the clamp device.

The reciprocation drive mechanism of the invention can employ a wide variety of mechanisms that are capable of favorably moving the clamp jig forward and rearward. Such mechanisms include those conventional hydraulic cylinders as well as screw mechanisms and cam mechanisms for converting a rotary motion to a linear motion. However, it is desirable to employ a mechanism simple in configuration and easy to operate. In this connection, the hydraulic cylinder is preferred because the hydraulic cylinder permits the clamp device to be easily constructed by merely connecting the piston rod to the clamp jig by means of a coupling member or the like.

As heretofore, the clamp mechanism employed by the invention is not limited to the steel-ball type mechanism where the steel balls are outwardly/inwardly movably fitted in the through-holes formed in the clamp sleeve but the collet chuck type mechanism is also adoptable. In machine tools, however, the steel-ball type mechanism is more adapted to fit with the configuration of the pull-stud bolt of a general tool holder. That is, the steel-ball type mechanism providing more stable clamp state is preferred.

Advantageous Effects of Invention

According to the invention just as described above, the draw-in sleeve is disposed in a rearward bore region of the spindle body in order to transmit the axial reciprocation drive to the draw-in bolt connected to the rear end of the clamp sleeve. In the clamp state, the draw-in sleeve is fixed to the spindle boy by means of the clamp jig and the steel balls. Therefore, the elastic member interposed between the draw-in sleeve and the draw-in bolt needs only as much expansion/contraction stroke as to produce the restoring-based elastic energy required for moving the draw-in bolt and clamp sleeve rearward to positions in the clamp state. In the case where the coned disc spring is used, for example, the number of coned disc spring pieces disposed in the spindle body is far less than before. Accordingly, the coned disc spring occupies a very small space, thus enabling the shortening of the spindle and the following downsizing of the spindle device.

DESCRIPTION OF EMBODIMENTS

Figure 1A:
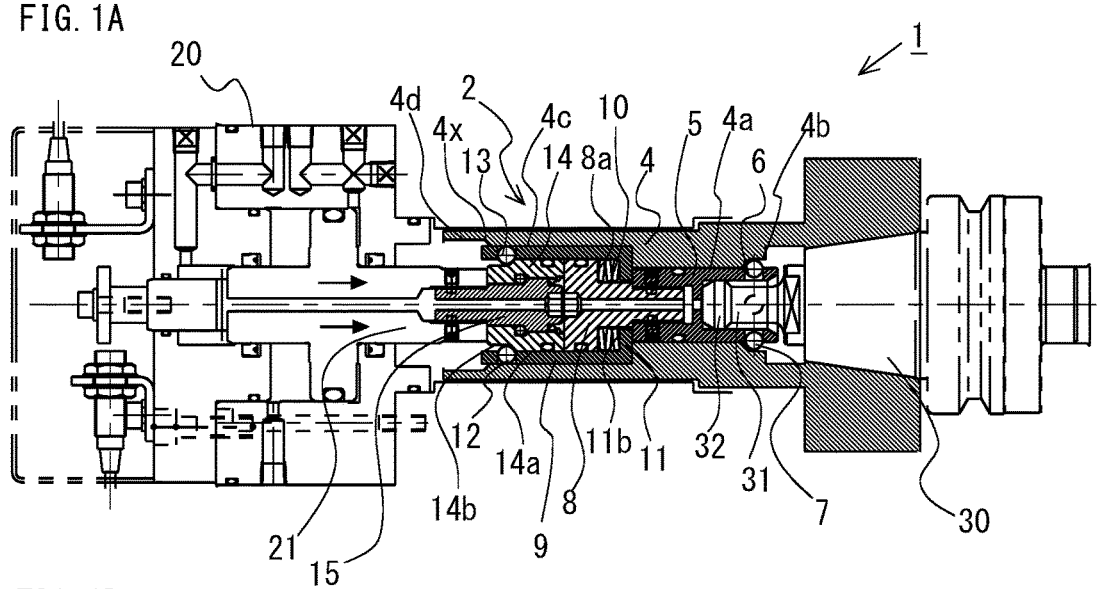
FIG. 1 is a group of schematic sectional side views showing a configuration of a clamp device according to one embodiment of the invention, FIG. 1A showing an unclamp state, FIG. 1B showing an intermediate state, and FIG. 1C showing a clamp state.
Figure 1B:
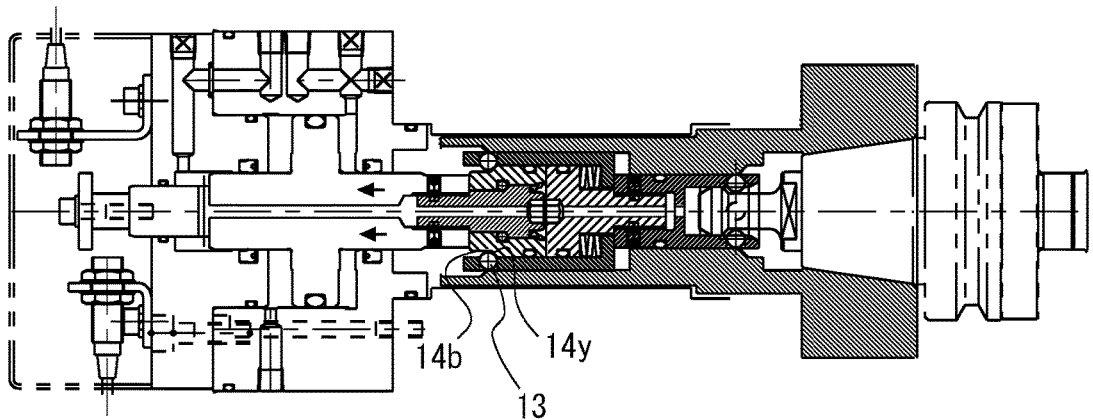
Figure 1C:
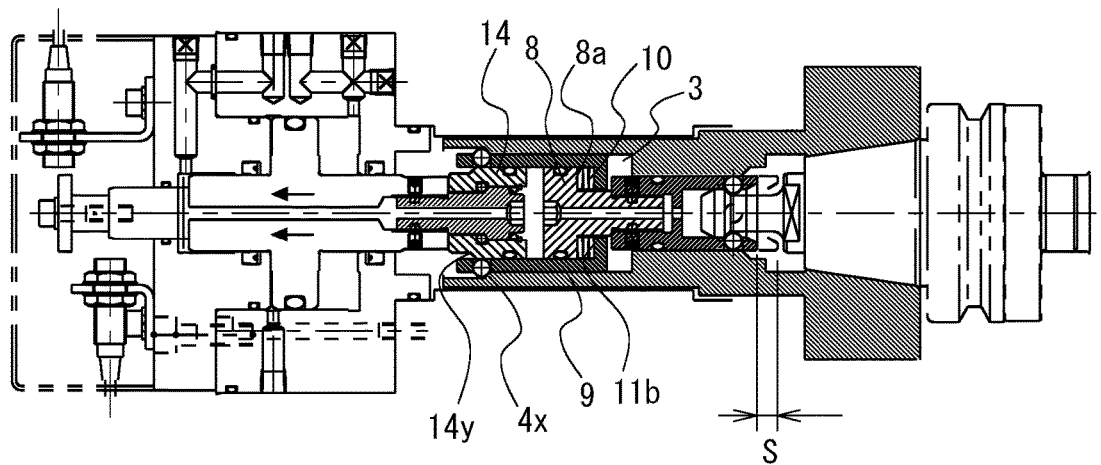
Figure 2:
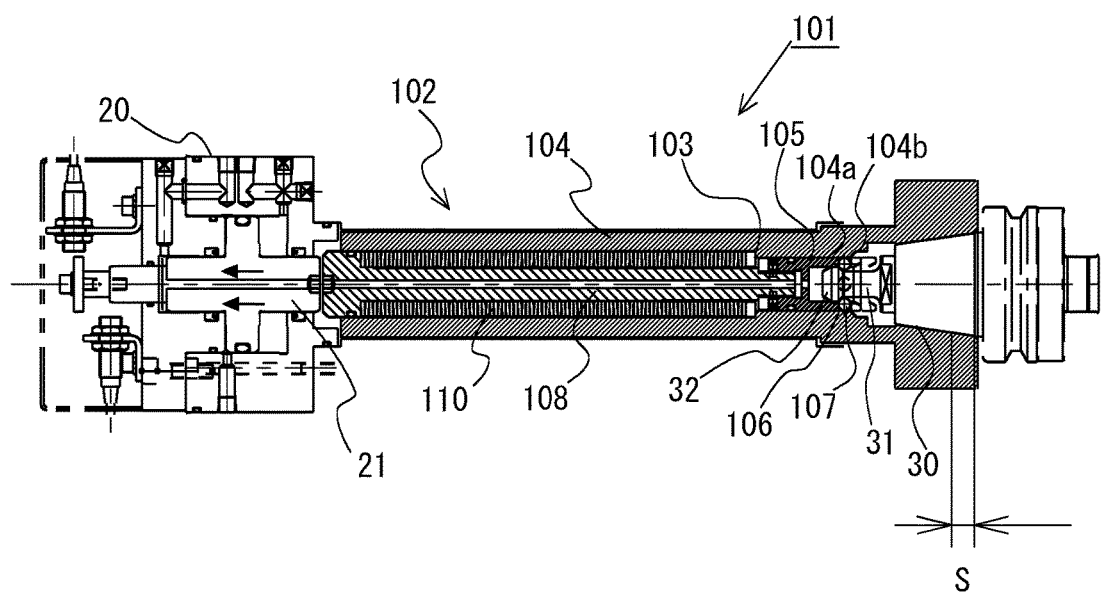
FIG. 2 is a schematic sectional side view showing an example of a conventional clamp device in a clamp state.

A clamp device having a steel-ball type clamp mechanism according to one embodiment of the invention is shown in sectional side views of FIG. 1. FIG. 1A shows an unclamp state, FIG. 1B showing an intermediate state and FIG. 1C showing a clamp state, respectively.

A clamp device 1 according to the embodiment hereof is installed in a rotary spindle device such as a machine tool. A principal part of the clamp device is disposed in an interior space 3 of a hollow spindle body 4 constituting a spindle 2. First, a cylindrical clamp sleeve 5 is axially slidably disposed in a forward region in the spindle body 4. A plurality of through-holes 6 are formed at a distal end of the clamp sleeve 5 and arranged on a circumference thereof with equal angular spaces. Each of the through-holes 6 has a steel ball 7 fitted therein that is allowed to move inward of and outward from the clamp sleeve 5.

The spindle body 4, which defines an outer peripheral region for this clamp sleeve 5, acts as the outer sleeve. The spindle body and the clamp sleeve implement the clamp mechanism which shifts between the unclamp state and the clamp state, related to a pull-stud bolt 31 of a tool holder 30, in conjunction with relative movement between these components.

Specifically, the spindle body 4 includes in the forward bore region thereof: a forward small diameter portion 4a conformable to an outside diameter of the clamp sleeve 5; and a forward large diameter portion 4b diametrally expanded from the above diameter portion 4a. When, in the unclamp state, the through-holes 6 at the distal end of the clamp sleeve 5 are positioned at the forward large diameter portion 4b of the spindle body 4, the steel balls 7 in the through-holes 6 are allowed to move outward from the clamp sleeve 5 and hence, a head 32 of the pull-stud bolt 31 connected to the tip of the tool holder 30 is allowed to pass through the region of the through-holes 6 rearward from the distal end of the clamp sleeve 5 while pushing outward the steel balls 7. After the insertion of the pull-stud bolt 31, the through-holes 6 are moved to the forward small diameter portion 4a of the spindle body 4 by moving the clamp sleeve 5 rearward while the steel balls 7 are pushed inward of the through-holes 6 and fitted in a constriction under the head of the pull-stud bolt 31, clamping down the pull-stud bolt. Thus is established the clamp state related to the tool holder 30.

One end of a draw-in bolt 8 for moving the clamp sleeve 5 forward and backward in an axial direction of the spindle 2 is connected to a rear end of the clamp sleeve 5. Disposed in a rearward region of the interior space of the spindle body 4 is a mechanism for transmitting a reciprocating motion of a reciprocation drive mechanism to this draw-in bolt 8. This embodiment employs a hydraulic cylinder 20 as the reciprocation drive mechanism.

Specifically, a cylindrical draw-in sleeve 9 is axially slidably disposed in the interior space of the spindle body 4 at place on the opposite side from the clamp sleeve 5. A clamp jig 14 is connected via a coupling member 15 to a distal end of a piston rod 21 reciprocated by a hydraulic oil pumped in and out by the hydraulic cylinder 20. The clamp jig is slidably inserted into the draw-in sleeve 9 from a rear end thereof. Further, the other end of the draw-in bolt 8 is engaged with a front end of the draw-in sleeve 9 via a coned disc spring 10.

The engagement between the draw-in sleeve 9 and the draw-in bolt 8 via the coned disc spring 10 is specifically implemented in the following configuration. The draw-in sleeve 9 is formed with an engagement wall 11 at a front end thereof such that the engagement wall closes the front end of the draw-in sleeve as penetrated by the one end portion of the draw-in bolt 8. On the other hand, the other end of the draw-in bolt 8 is shaped like a disc which is substantially conformable to an inside diameter of the draw-in sleeve 9 and axially movable in the draw-in sleeve 9. A front surface 8a of the other end of this draw-in bolt 8 is opposed to a rear surface 11b of the engagement wall 11 of the draw-in sleeve 9 while the coned disc spring 10 is interposed between these surfaces. In this manner, the draw-in sleeve 9 and the draw-in bolt 8 are engaged with each other at the rear surface 11b of the engagement wall and at the front surface 8a of the other end via the coned disc spring 10 interposed therebetween.

The draw-in sleeve 9 includes a plurality of through-holes 12 formed on a circumference of the rear end thereof at equal angular spaces. The draw-in sleeve further includes steel balls 13 which have a diameter greater than the thickness of the draw-in sleeve 9 and which are fitted in the through-holes 12 in one-on-one relation as allowed to move outward from and inward of the through-hole 12. The spindle body 4 defining an outer periphery region of the draw-in sleeve includes in a rearward bore region thereof: a rearward small diameter portion 4c conformable to an outside diameter of the draw-in sleeve 9; a diametrally expanding portion 4x progressively increasing in diameter from the rearward small diameter portion toward the rear side in a tapered fashion; a rearward large diameter portion 4d constant in diameter and continuous to the diametrally expanding portion 4x.

The clamp jig 14 includes: a jig large diameter portion 14a conformable to the inside diameter of the draw-in sleeve 9; a jig diametrally reducing portion 14y progressively decreasing in diameter from a rear end of the jig large diameter portion 14a in a tapered fashion; and a jig small diameter portion 14b constant in diameter and continuous to the jig diametrally reducing portion 14y. Thus, the draw-in sleeve 9 is relatively movably interposed between the clamp jig 14 and the rearward bore region of the spindle body 4. Therefore, the steel balls 13 are moved inward of or outward from the through-holes 12 depending upon a position of the through-holes 12 relative to the clamp jig 14 and the rearward bore region of the spindle body 4.

The clamp device 1 of the embodiment having the above-described configuration performs the following clamp operation.

When mounting the tool holder 30, the clamp device 1 is placed in the unclamp state by driving the hydraulic cylinder 20 to move forward the piston rod 21. The clamp jig 14 connected to the distal end of the piston rod 21 via the coupling member 15 is axially moved forward in the interior space 3 of the hollow spindle body 4 in conjunction with the forward movement of the piston rod and is abutted against a rear surface of the other end of the draw-in bolt 8 in the draw-in sleeve 9, thus pushing forward this draw-in bolt 8. As pushed forward, the draw-in bolt 8 also pushes forward the draw-in sleeve 9 by pressing the coned disc spring 10 against the rear surface 11b of the engagement wall 11 of the draw-in sleeve 9 by means of the front surface 8a of the other end thereof.

The clamp sleeve 5 is also pushed forward by the forward movement of these draw-in bolt 8 and the draw-in sleeve 9. As described above, the clamp sleeve 5 is placed in the unclamp state (FIG. 1A) such as to allow the head 32 of the pull-stud bolt 31 of the tool holder 30 to pass through the distal end thereof. At this time, the through-holes 12 of the draw-in sleeve 9 are located at the rearward small diameter portion 4c of the rearward bore region of the spindle body 4, while the steel balls 13 are pushed inward of the draw-in sleeve 9 and protruded to the jig small diameter portion 14b of the clamp jig 14.

After the insertion of the pull-stud bolt 31 of the tool holder 30 into the distal end of the clamp sleeve 5, the drive of the hydraulic cylinder 20 is switched to move the piston rod 21 rearward for shifting the clamp device to the clamp state. Thus, the rearward movement of the clamp jig 14 is started.

At the beginning of this transition, the steel balls 13 of the draw-in sleeve 9 are protruded to the jig small diameter portion 14b on the inner side, as shown in FIG. 1B. In conjunction with the rearward movement of the clamp jig 14, therefore, the draw-in sleeve 9 is also pulled rearward by means of the steel balls 13 engaged with the jig diametrally reducing portion 14y of the clamp jig 14.

As the draw-in sleeve 9 is moved rearward, the rear surface 11b of the engagement wall 11 at the front end of the draw-in sleeve compresses the coned disc spring 10 against the front surface 8a of the other end of the draw-in bolt 8. The draw-in bolt 8 is pulled rearward as receiving the restorative force of the coned disc spring 10 on the front surface 8a of the other end thereof. Thus, the draw-in bolt 8 moves the clamp sleeve 5 rearward.

When, on the other hand, the clamp jig 14 is moved further rearward, thus bringing the through-holes 12 of the draw-in sleeve 9 to the rearward large diameter portion 4d in the rearward bore region of the spindle 4, the steel balls 13 are allowed to move outward. In conjunction with further rearward movement of the clamp jig 14, the steel balls 13 are pushed outward along a tapered surface of the jig diametrally reducing portion 14y of the clamp jig 14. Thus, the steel balls are engaged with the spindle body 4 at the diametrally expanding portion 4x in the rearward bore region thereof. Thus, the draw-in sleeve 9 is fixed to the spindle body 4 by means of the clamp jig 14 and the steel balls 13.

When the clamp sleeve 5 in the unclamp state is moved rearward by a distance S by the above-described operations, the steel balls 13 are externally pushed inward of the distal end of the clamp sleeve 5 by the forward small diameter portion 4a in the forward bore region of the spindle body 4 on the outer periphery of the clamp sleeve. The steel balls clamp down the pull-stud bolt 31 of the tool holder 30, thus establishing the clamp state shown in FIG. 1C.

After the establishment of the clamp state, the holding power on the tool holder 30 is provided by the spindle body 4, to which the draw-in sleeve 9 is fixed by means of the clamp jig 14 and the steel balls 13. As a result, the number of coned disc spring pieces 10 disposed in the spindle body 4 is notably decreased from those used in the conventional clamp device.

REFERENCE SIGNS LIST 1, 101: clamp device,
2, 102: spindle
3, 103: interior space of spindle
4, 104: spindle body
4a, 104a: forward small diameter portion
4b, 104b: forward large diameter portion
4c: rearward small diameter portion
4x: diametrally expanding portion
4d: rearward large diameter portion
5, 105: clamp sleeve
6, 106: through hole
7, 107: steel ball
8, 108: draw-in bolt
8a: front surface of the other end
9: draw-in sleeve
10, 110: coned disc spring
11: engagement wall
11b: rear surface of engagement wall
12: through-hole
13: steel ball
14: clamp jig 14a: jig large diameter portion
14y: jig diametrally reducing portion
14b: jig small diameter portion
15: coupling member
20: hydraulic cylinder
21: piston rod
30: tool holder
31: pull-stud bolt
32: head

The invention claimed is:

1. A clamp device for removably mounting a tool holder with a tool to a spindle of a rotary spindle device, which device includes: a hollow spindle body constituting the spindle; a cylindrical clamp sleeve axially slidably disposed in an interior space of the spindle body; and a forward small diameter portion conformable to an outside diameter of the clamp sleeve and a forward large diameter portion diametrally expanded from the above diameter portion, the forward small diameter portion and forward large diameter portion defined in a forward bore region of the spindle body, and which is equipped with a clamp mechanism which establishes a clamp state to clamp down a pull-stud bolt connected to a tip of the tool holder by moving a distal end of the clamp sleeve in the bore region of the spindle body from the forward large diameter portion to the forward small diameter portion, and which establishes an unclamp state to release the pull-stud bolt from clamping by moving the distal end of the clamp sleeve from the forward small diameter portion to the forward large diameter portion, the clamp device further comprising: a draw-in bolt having an end connected to a rear end of the clamp sleeve opposite from the tool holder;

a cylindrical draw-in sleeve axially slidably disposed in the interior space of the spindle body on the opposite side from the clamp sleeve; and a clamp jig slidably inserted in the draw-in sleeve from a rear end thereof and axially reciprocated in the spindle body as connected to a reciprocation drive mechanism on a side opposite from the tool holder of the spindle, wherein the draw-in bolt has the other end engaged with a front end of the draw-in sleeve via an elastic member, the draw-in sleeve includes: a plurality of through-holes formed on a circumference of a rear end thereof at equal angular spaces; and steel balls fitted in the respective through-holes as allowed to move outward from and inward of the through-holes and having a diameter greater than the thickness of the draw-in sleeve, the spindle body includes on a rear side of the bore region thereof opposite from the tool holder: a rearward small diameter portion conformable to an outside diameter of the draw-in sleeve; a diametrally expanding portion progressively increasing in diameter from the rearward small diameter portion toward the rear side in a tapered fashion; and a rearward large diameter portion constant in diameter and continuous to the diametrally expanding portion, the clamp jig includes: a jig large diameter portion conformable to an inside diameter of the draw-in sleeve; a jig diametrally reducing portion progressively decreasing in diameter from a rear end of the jig large diameter portion in a tapered fashion; and a jig small diameter portion constant in diameter and continuous to the jig diametrally reducing portion, and clamp jig places the clamp mechanism in the unclamp state by way of forward movement produced by the reciprocation drive mechanism in which movement the draw-in bolt, the other end of which is engaged in the draw-in sleeve, is pushed forward against a biasing force of the elastic member, thus moving forward the clamp sleeve, or places the clamp mechanism in the clamp state by way of rearward movement produced by the reciprocation drive mechanism in which movement the draw-in sleeve engaged with the clamp jig via the steel balls is moved rearward to bring the through-holes thereof to the rearward large diameter portion in the bore region of the spindle body and further rearward to a position where the steel balls are retained between the rearward large diameter portion and the jig large diameter portion, while the retreated draw-in sleeve moves rearward the draw-in bolt and the clamp sleeve by way of the biasing force of the elastic member.

2. The clamp device according to claim 1, wherein the reciprocation drive mechanism is a hydraulic cylinder, and the clamp jig is connected to a piston rod reciprocally driven by a hydraulic oil of the hydraulic cylinder.

3. The clamp device according to claim 1, wherein the clamp mechanism includes: a plurality of through-holes formed on a circumference of a front end of the clamp sleeve at equal angular spaces; and steel balls fitted in the respective through-holes as allowed to move outward from and inward of the through-holes and having a diameter greater than the thickness of the clamp sleeve.

4. The clamp device according to claim 2, wherein the clamp mechanism includes: a plurality of through-holes formed on a circumference of a front end of the clamp sleeve at equal angular spaces; and steel balls fitted in the respective through-holes as allowed to move outward from and inward of the through-holes and having a diameter greater than the thickness of the clamp sleeve.

* * * * *